(12) United States Patent
Ueda et al.

(10) Patent No.: US 11,156,703 B2
(45) Date of Patent: Oct. 26, 2021

(54) ULTRASONIC SENSOR

(71) Applicant: DENSO CORPORATION, Kariya (JP)

(72) Inventors: Keisuke Ueda, Kariya (JP); Takeo Tsuzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 684 days.

(21) Appl. No.: 16/064,681

(22) PCT Filed: Dec. 21, 2016

(86) PCT No.: PCT/JP2016/088130
§ 371 (c)(1),
(2) Date: Jun. 21, 2018

(87) PCT Pub. No.: WO2017/110884
PCT Pub. Date: Jun. 29, 2017

(65) Prior Publication Data
US 2019/0004161 A1 Jan. 3, 2019

(30) Foreign Application Priority Data
Dec. 25, 2015 (JP) .............................. JP2015-254447

(51) Int. Cl.
*G01S 7/52* (2006.01)
*G01S 7/521* (2006.01)
(Continued)

(52) U.S. Cl.
CPC .............. *G01S 7/521* (2013.01); *B60R 11/00* (2013.01); *B60R 19/483* (2013.01);
(Continued)

(58) Field of Classification Search
CPC ........ G01S 7/521; G01S 15/93; G01S 15/931; G01S 2015/938; B60R 11/00; B60R 19/48; B60R 19/483; B60R 2011/0047
See application file for complete search history.

(56) References Cited

U.S. PATENT DOCUMENTS 3,850,326 A * 11/1974 Ryles .................. B65D 50/045
215/224
5,729,077 A * 3/1998 Newnham .............. H02N 2/043
310/328
(Continued)

FOREIGN PATENT DOCUMENTS

| EP | 2527863 A1 | 11/2012 |
|---|---|---|
| EP | 2869081 A1 | 5/2015 |
| JP | 2013-107493 A | 6/2013 |

*Primary Examiner* — Isam A Alsomiri
*Assistant Examiner* — Amie M Ndure
(74) *Attorney, Agent, or Firm* — Maschoff Brennan

(57) ABSTRACT

An ultrasonic sensor is secured to an attachment object and passes through the attachment object. The ultrasonic sensor includes an oscillator which has a transceiving surface which transmits or receives an ultrasonic wave, a cylindrical elastic member which surrounds an outer surface of the oscillator extending from the transceiving surface in a thickness-wise direction of the transceiving surface and has an inner surface contacting the outer surface of the oscillator, a body which has a housing with a bottom and in which the to oscillator and the elastic member are disposed except a protruding portion on a side of said transceiving surface, and an annular body which surrounds the protruding portion of the elastic member and is disposed in the body in contact with a front of the attachment object. A gap is provided between an outer surface of the protruding portion of the elastic member and an inner surface of the annular body which faces the outer surface of the protruding portion, thereby minimizing the ingress of water into the body.

8 Claims, 8 Drawing Sheets

(51) Int. Cl.
*G01S 15/931* (2020.01)
*B60R 11/00* (2006.01)
*B60R 19/48* (2006.01)

(52) U.S. Cl.
CPC ..... *G01S 15/931* (2013.01); *B60R 2011/0047* (2013.01); *G01S 2015/938* (2013.01)

(56) References Cited

U.S. PATENT DOCUMENTS

| | | | |
|---|---|---|---|
| 2006/0241474 | A1 | 10/2006 | Kawashima et al. |
| 2007/0220981 | A1 | 9/2007 | Nakajima et al. |
| 2008/0040005 | A1* | 2/2008 | Breed .................. H01H 35/146 701/48 |
| 2008/0046149 | A1* | 2/2008 | Breed .................. G01F 23/0076 701/45 |
| 2008/0161989 | A1* | 7/2008 | Breed ............... B60R 21/01532 701/31.4 |
| 2009/0139951 | A1* | 6/2009 | Chen .................. B65D 51/2835 215/227 |
| 2013/0009528 | A1* | 1/2013 | Li ........................... G01S 7/521 312/223.1 |
| 2016/0291139 | A1* | 10/2016 | Tsuji ....................... G01S 7/521 |

* cited by examiner

ULTRASONIC SENSOR

CROSS REFERENCE TO RELATED DOCUMENT

The present application claims the benefit of priority of Japanese Patent Application No. 2015-254447 fled on Dec. 25, 2015, the disclosure of which is incorporated herein by reference.

TECHNICAL FIELD

The invention relates generally to an ultrasonic sensor.

BACKGROUND ART

Prior Art

A control device is known which measure a distance between a vehicle and an object around the vehicle using an ultrasonic sensor attached to, for example, a bumper of the vehicle to avoid an accidental collision of the vehicle with the object.

Japanese Patent First Publication No. 2013-107493 discloses the above type of ultrasonic sensor. The ultrasonic sensor includes an oscillator, an elastic member, a body, and an annular body. The oscillator has a transceiving surface which transmits or receives an ultrasonic wave. The elastic member surrounds an outer surface of the oscillator. The body has the oscillator and the elastic member disposed therein. The annular body surrounds the elastic member and is attached to the body in contact with a front surface of an attachment object. The annular body is secured to the attachment body and passes through the attachment object.

SUMMARY OF THE INVENTION

Problem to be Solved by the Invention

The vehicle in which the ultrasonic sensor, as taught in the above publication, is installed is sometimes washed using a high-pressure washing machine. In this instance, water may enter the body under pressure thereof through a clearance between a housing and the elastic member or between the elastic member and the oscillator. This may result in an increase in pressure in the body, which ejects the oscillator outside the housing.

The present invention was made for solving the above problem. It is an object of the invention to provide an ultrasonic sensor which minimizes ingress of water into a body.

Means for Solving the Problem

The present invention is an ultrasonic sensor which is attached to an attachment object and passes through the attachment object and comprises: (a) an oscillator which has a transceiving surface which transmits or receives an ultrasonic wave; (b) a cylindrical elastic member which surrounds an outer surface of the oscillator which extends from said transceiving surface in a thickness-wise direction of the transceiving surface, the elastic member having an inner surface contacting the outer surface of the oscillator; (c) a body which has a housing with a bottom and in which said oscillator and said elastic member are disposed except a protruding portion on a side of said transceiving surface; and (d) an annular body which surrounds the protruding portion of said elastic member and is disposed in said body in contact with a front of the attachment object. A gap is provided between an outer surface of the protruding portion of said elastic member and an inner surface of said annular body which faces the outer surface of the protruding portion.

When the transceiving surface is splashed with water at the front of the attachment object, the water enters the gap between the elastic member and the annular body and then flows outside the body through the gap. The pressure of the water is exerted on the elastic member to deform the elastic member, thereby increasing the pressure to urge the elastic member into contact with the oscillator. This minimizes the entrance of water into between the elastic member and the oscillator, thereby preventing water from entering the body when the transceiving surface is splashed with water at the front of the attachment object.

EMBODIMENTS FOR CARRYING OUT THE INVENTION

Embodiments of this invention will be described below with reference to the drawings. Throughout the embodiments, same reference numbers will refer to the same or similar parts.

An ultrasonic sensor according to the first embodiment will be described. The ultrasonic sensor is mounted, for example, on a bumper of a vehicle to detect an object around the vehicle.

Figure 1:
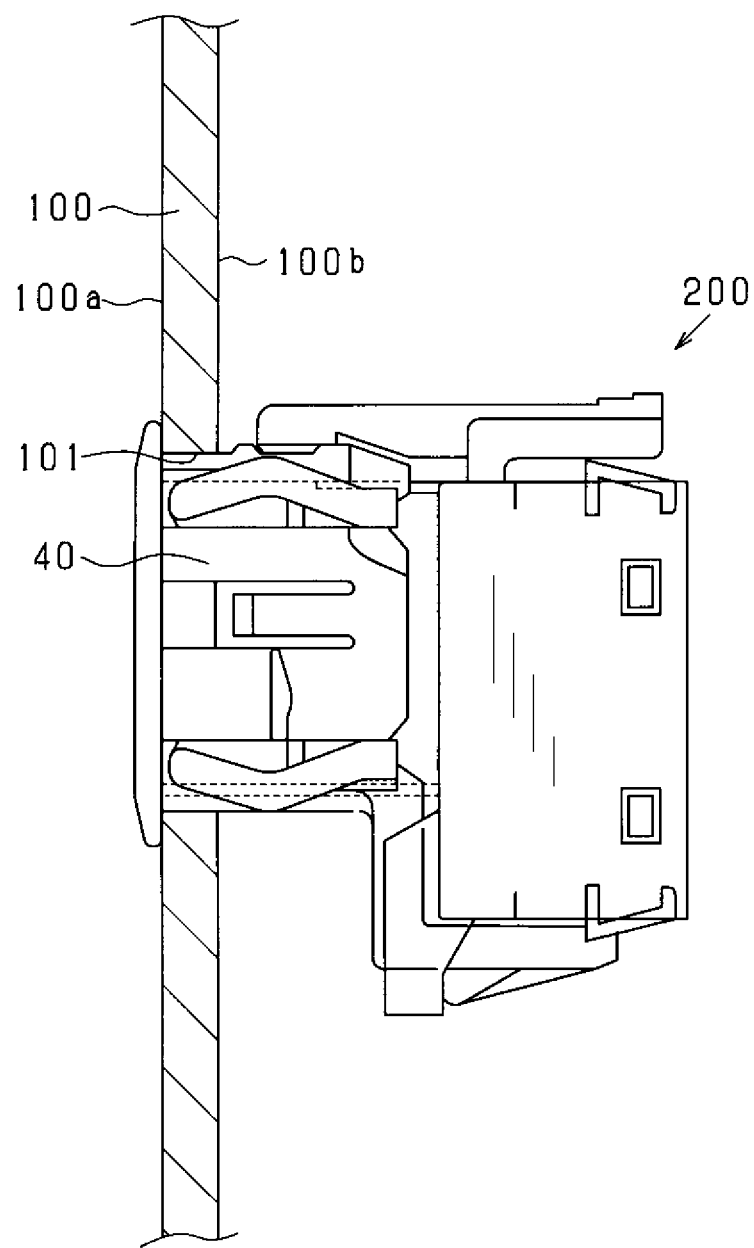
FIG. 1 is a side view which illustrates an ultrasonic sensor attached to a bumper.
Figure 2A:
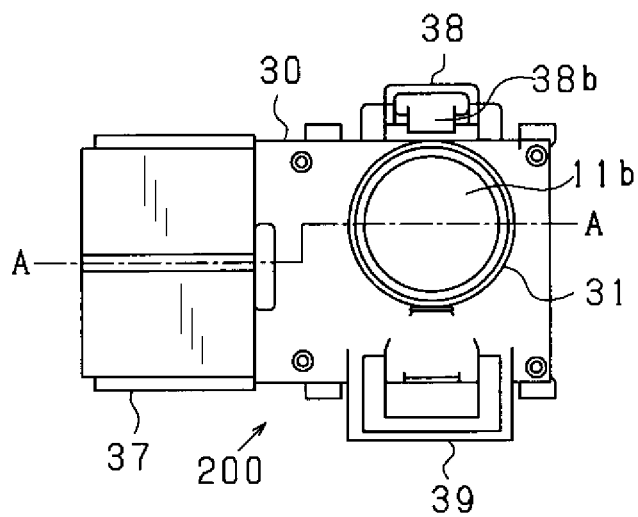
FIG. 2(a) is a front view of a sensor body.
Figure 2B:
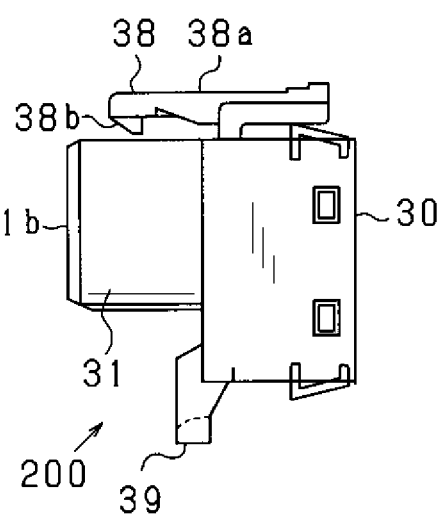
FIG. 2(b) is a right side view of a sensor body.
Figure 2C:
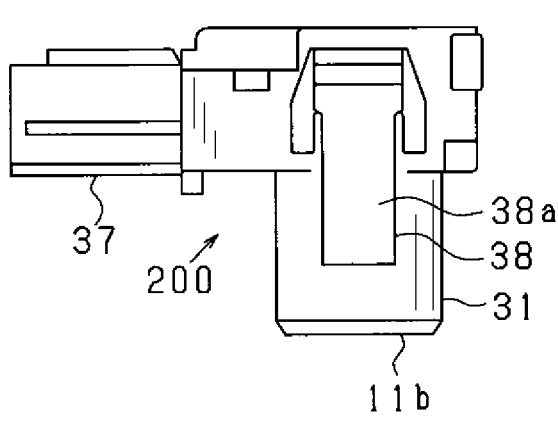
FIG. 2(c) is a top view of a sensor body.
Figure 2D:
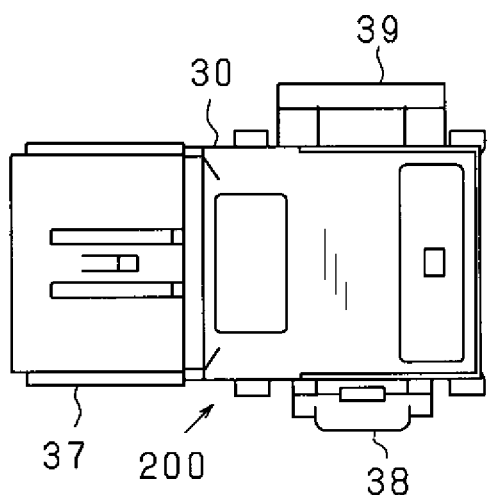
FIG. 2(d) is a back view of a sensor body.

FIG. 1 is a side view of the ultrasonic sensor of this embodiment which is mounted on the bumper 100 that is an attachment object. FIG. 1 illustrates only a section of the bumper 100.

The ultrasonic sensor is firmed mounted in the hole 101 of the bumper 100. The ultrasonic sensor includes the sensor body 200 and an annular bezel 40. The installation of the ultrasonic sensor to the bumper 100 is achieved by inserting the bezel 40 into the hole 101 from outside the front 100a of the bumper 100 and then fitting the sensor body 200 into the bezel 40 from behind the back 100b of the bumper 100.

Figure 3:
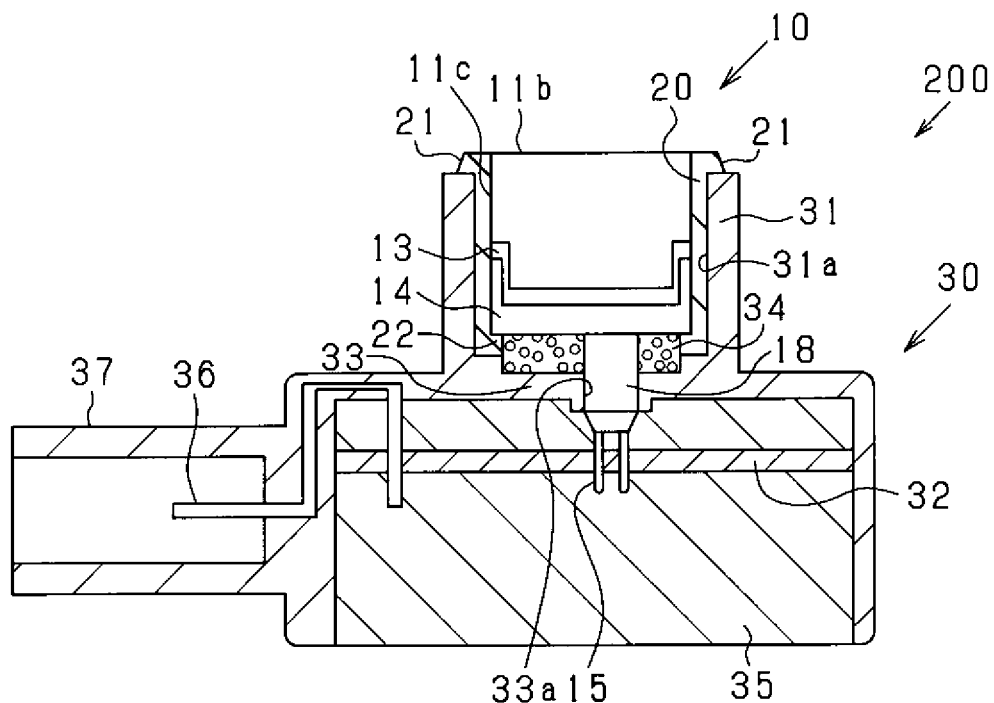
FIG. 3 is a sectional view taken along the line A-A in FIG. 2(a).
Figure 4:
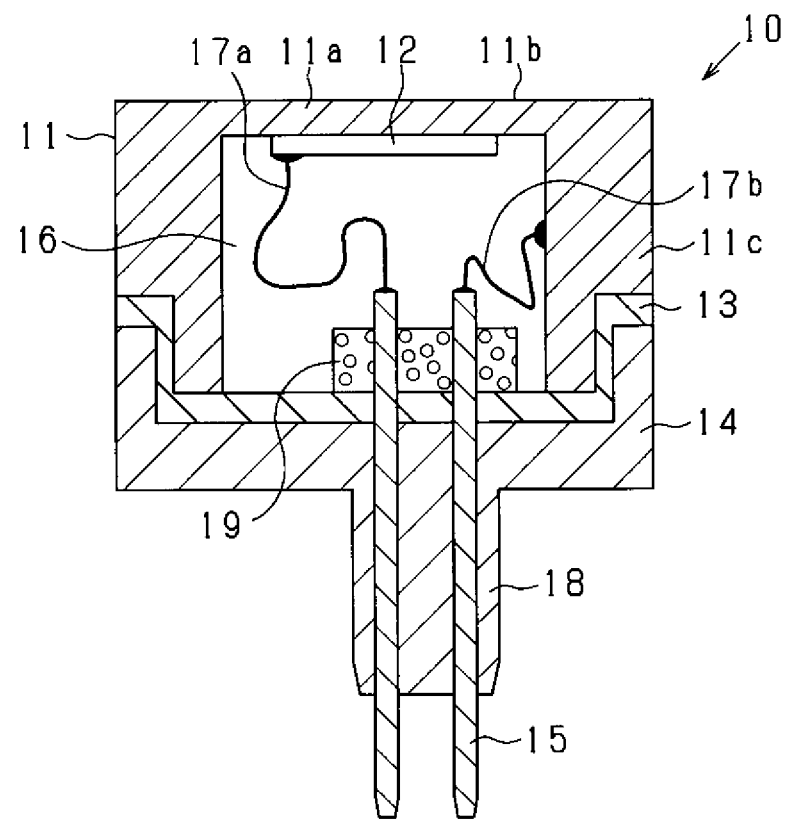
FIG. 4 is a sectional view of an oscillator.
Figure 5A:
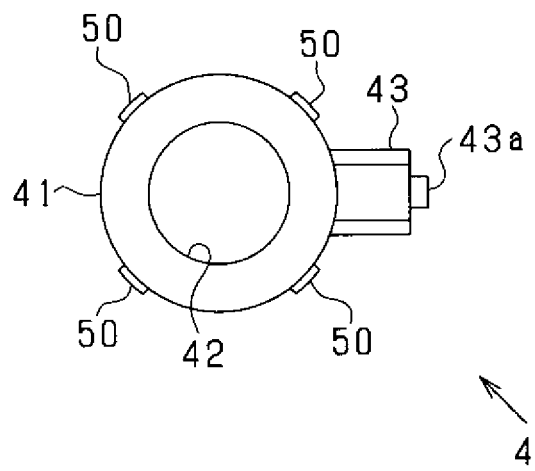
FIG. 5(a) is a front view of a bezel.
Figure 5B:
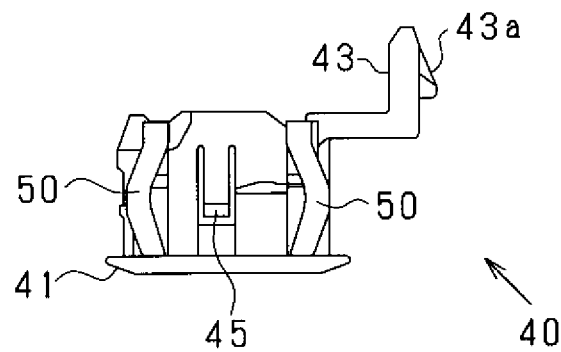
FIG. 5(b) is a left side view of a bezel.
Figure 5C:
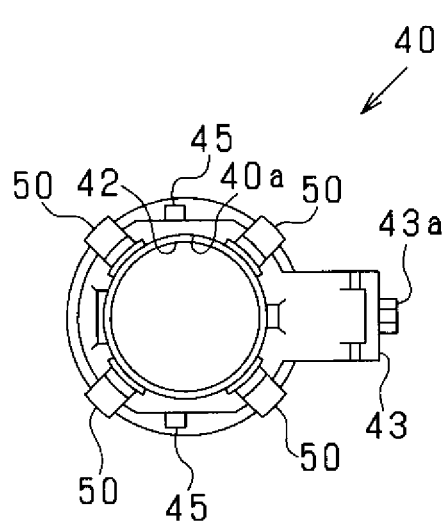
FIG. 5(c) is a back view of a bezel.
Figure 5D:
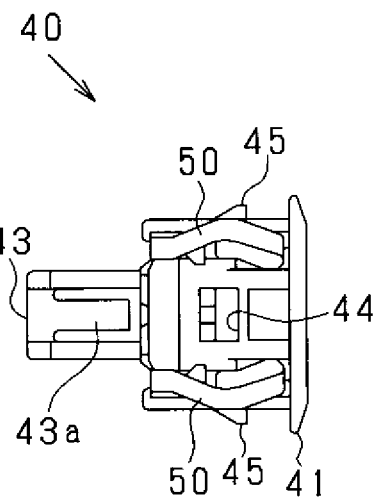
FIG. 5(d) is a top view of a bezel.
Figure 5E:
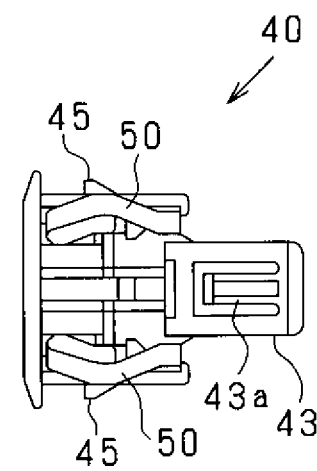
FIG. 5(e) is a bottom view of a bezel.

The structure of the sensor body 200 of the ultrasonic sensor will be described blow using FIGS. 2(a) to 4. The sensor body 200 is, as illustrated in FIGS. 2(a) to 2(d) and 3, equipped with the body 30 in which the oscillator 10 is installed. The oscillator 10, as illustrated in FIG. 4, includes the housing 11, the piezoelectric device 12, the spacer 13, the base 14, and the connecting pins 15.

The housing 11 is made of conductive material in the form of a cylinder with a bottom. The housing 11 has the inner chamber 16 formed therein. The housing 11 has the piezoelectric device 12 glued to an inner surface of the bottom 11a. The bottom 11a has an outer surface serving as the transceiving surface 11b. The conductive material of the housing 11 is aluminum. The transceiving surface 11b is circular in shape.

The piezoelectric device 12 is made of piezoelectric ceramic, such as lead zirconate titanate ceramic and has electrodes on front and rear surfaces thereof. One of the electrodes of the piezoelectric device 12 is electrically connected to one of the connecting pins 15 through the lead 17a. The other electrode of the piezoelectric device 12 is attached to the bottom 11a of the housing 11 using, for example, conductive adhesive, electrically connected to the lead 17b through the housing 11, and then to the other connecting pin 15. The inner chamber 16 of the housing 11 is filled with vibration isolating material such as silicone rubber and works to control unwanted vibration transmitted from the transceiving surface 11b to the connecting pins 15.

The spacer 13 is interposed between an opening of the housing 11 and the base 14. The spacer 13 is made of elastic material, such as silicone rubber, which serves to suppress transmission of unwanted vibration, as generated in the cylinder 11c of the housing 11 by vibration of the bottom 11a of the housing 11, to the base 14 secured to the connecting pins 15.

The base 14 is fit on the outer periphery of the opening of the housing 11 using the spacer 13, so that it is firmly secured to the housing 11. The base 14 is made of insulating material, for example, synthetic resin such as acrylonitrile-butadiene-styrene (ABS) resin. The base 14 has the protector 18 which is wrapped about the connecting pins 15 and protrudes toward the circuit board 32. The connecting pins 15 pass through the protector 18. In formation of the base 14, the connecting pins 15 are insert-molded, so that portions of the connecting pins 15 are embedded in the base 14.

The connecting pins 15 are each made of, for example, conductive material mainly containing copper in the form of a bar having a diameter of 0.5 mm.

The oscillator 10 is equipped with the foamed elastic body 19 formed by, for example, foamed silicone. The foamed elastic body 19 works to suppress the transmission of vibration to the base 14. The connecting pins 15 pass through the foamed elastic body 19.

The housing 11, the spacer 13, the base 14, and the foamed elastic body 19 are attached to each other using silicone adhesive to form the oscillator 10 in the form of a one-piece unit. The oscillator 10 is disposed in the hollow body 30 with side and bottom surfaces thereof covered by the elastic member 20. The body 30 is made of synthetic resin.

The elastic member 20 is formed by elastic resin such as silicone rubber. The elastic member 20 is cylindrical and has the larger-diameter flange 21 formed on a front end that is one of ends of a length thereof. The elastic member 20 also has the smaller-diameter bottom 22 formed on a rear end that is the other end of the length thereof. The outer periphery of the flange 21 is shaped to have a tapered surface whose outer dimension or diameter gradually decreases toward the top end thereof. In other words, the flange 21 is of a tapered shape. The flange 21 has a surface which is opposed to the top end thereof and extends perpendicular to the outer surface of the elastic member 20.

The elastic member 20 has an inner surface whose diameter is identical with an outer diameter of the housing 11 of the oscillator 10. The elastic member 20 has the oscillator 10 installed therein. Specifically, the outer surface of the oscillator 10, that is, the outer surface of the housing 11 is placed in contact with the inner surface of the elastic member 20. The oscillator 10 has a bottom surface placed in contact with the bottom 22 of the elastic member 20. The diameter of the inner side surface of the elastic member 20 may be set smaller than the outer diameter of the housing 11 of the oscillator 10, thereby increasing the degree of contact between the elastic member 20 and the oscillator 10.

The distance between the front end of the elastic member 20 and the inner surface of the bottom 22 is equal to the distance between the transceiving surface 11b of the oscillator 10 and the bottom surface of the oscillator 10. Therefore, when the oscillator 10 is mounted in the elastic member 20, the transceiving surface 11b of the oscillator 10 substantially lies flush with the front end surface of the elastic member 20.

The body 30 is substantially of a hollow rectangular shape. The body 30 has the cylindrical side wall 31 with an upper opening. The inside of the side wall 31 functions as the housing 31a for the oscillator 10 and the elastic member 20. The side wall 31 has an inner diameter identical with an outer diameter of the elastic member 20. The side wall 31 also has an outer diameter greater than a maximum diameter of the flange 21. The distance between an opening surface of the side wall 31 and an inner bottom surface of the side wall 31 is equal to that between the surface of the flange 21 of the elastic member 20 which is opposed to the front end surface of the flange 21 and the bottom surface of the elastic member 20. Therefore, when the oscillator 10 and the elastic member 20 are disposed inside the side wall 31, the surface of the flange 21 of the elastic member 20 which is opposite the front end surface of the flange 21 is placed in contact with the upper end of the side wall 31, and the bottom surface of the elastic member 20 is placed in contact with the inner bottom surface of the side wall 31.

The side wall 31 has an inner surface contacting an outer surface of the elastic member 20. The upper end of the side wall 31 is partially covered with the flange 21 of the elastic member 20. The inner diameter of the side wall 31 may be selected to be smaller than the outer diameter of the elastic member 20 and also be greater than the outer diameter of the housing 11 of the oscillator 10. This enhances the pressure by which the side wall 31 contacts the elastic member 20 when the oscillator 10 and the elastic member 20 are disposed inside the side wall 31.

The body 30 has the guide 33 which serves to position the connecting pins 15 relative to locations where the connecting pins 15 should be joined to the circuit board 32. The guide 33 is made of a plate which isolates an inner space of the body 30 into an installation space for the oscillator 10 and an installation space for the circuit board 32. The guide 33 has formed therein the positioning hole 33a into which the connecting pins 15 and the protector 18 are inserted.

The oscillator 10 has the elastic member 20 placed in contact with an outer periphery thereof and also has the foamed elastic member 34 disposed below the base 14 to absorb vibration. The oscillator 10 is arranged inside the body 30.

After the oscillator 10 is installed in the body 30 in the above away, the connecting pins 15 are inserted into the positioning hole 33a of the guide 33 so that the tops of the connecting pins 15 are disposed in the circuit board 32. Electrical connections of the connecting pins 15 and the circuit board 32 are then achieved using soldering techniques.

The transceiving surface 11b of the oscillator 10 is exposed from the side wall 31 of the body 30, thereby causing ultrasonic waves produced by the oscillator 10 to be transmitted outside the body 30.

The foamed elastic member 34 is, like the foamed elastic body 19 disposed in the housing 11 of the oscillator 10, made of foamed silicone and has the connecting pins 15 and the protector 18 passing therethrough. The foamed elastic member 34 has a cut into which the protector 18 is insertable. The base 14 of the oscillator 10, the elastic member 20, and the foamed elastic member 34 are firmly joined together using silicone adhesive.

The inner space of the body 30 which is isolated by the guide 33 and in which the circuit board 32 is disposed is filled with the moistureproof member 35. The moistureproof member 35 may be made of silicone resin or urethane resin. This embodiment uses the silicon resin. The external output terminal 36 is, as illustrated in FIG. 3, provided to produce an output from the circuit board 32. The external output terminal 36 has an end exposed to the connector 37 formed on the surface of the body 30.

The body 30 has the attachment portion 38 disposed on an upper surface thereof and the receiving portion 39 formed on a bottom surface thereof. The attachment portion 38 is formed to protrude from the upper surface of the body 30 in the same direction as the side wall 31 and used for firm attachment to the bezel 40. Specifically, the attachment portion 38 is designed as a snap-fit feature and includes the bar 38a and the claw 38b. The bar 38a protrudes from the upper surface of the body 30 in the same direction as that in which the side wall 31 extends. The bar 38a has the claw 38b on a top end facing the side wall 31. The receiving portion 39 is of a frame shape and protrudes from the body 30. The receiving portion 39 is used for firm attachment to the bezel 40.

The oscillator 10 and the side wall 31 of the thus constructed sensor body 200, that is, cylindrical protruding portions of the body 30 are inserted into the bezel 40. The direction in which the side wall 31 protrudes is, thus, identical with a direction in which the sensor body 200 is inserted into the bezel 40.

Figure 6:
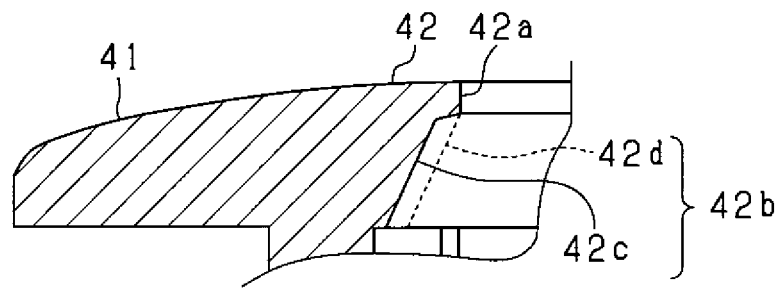
FIG. 6 is an enlarged sectional view of a front end portion of a bezel.

FIGS. 5(a) to 5(d) illustrate the structure of the bezel 40. FIG. 6 illustrates an enlarged section of the front end of the bezel 40. The bezel 40 is formed by substantially a cylindrical member made of synthetic resin. The bezel 40 has the hollow cylindrical portion 40a whose configuration and size are selected to correspond to those of the side wall 31 of the sensor body 200. The side wall 31 is inserted into the cylindrical portion 40a.

The bezel 40 has the larger-diameter outer flange 41 formed on the outer periphery of the front end portion thereof in the axial direction. The bezel 40 also has the smaller-diameter inner flange 42 formed on the inner periphery of the front end portion thereof. The outer periphery of the outer flange 41 has a diameter which gradually increases from an end surface of the front end portion. In other words, the outer flange 41 is of a tapered shape. The inner flange 42 includes the outer surface portion 42a and the tapered portion 42b. The outer surface portion 42a is an inner periphery of the inner flange 42 which has a diameter kept constant in the axial direction. The tapered portion 42b is formed by the inner periphery of the inner flange 42 and has a diameter gradually increases from the front end of the tapered portion 42b. An angle the inner peripheral surface of the tapered portion 42b makes with the center axis is identical with that the flange 21 of the elastic member 20 makes with the center axis. In other words, on a plane passing through the center axis, the inner peripheral surface of the tapered portion 42b extends parallel to the outer peripheral surface of the flange 21 of the elastic member 20.

Figure 11:
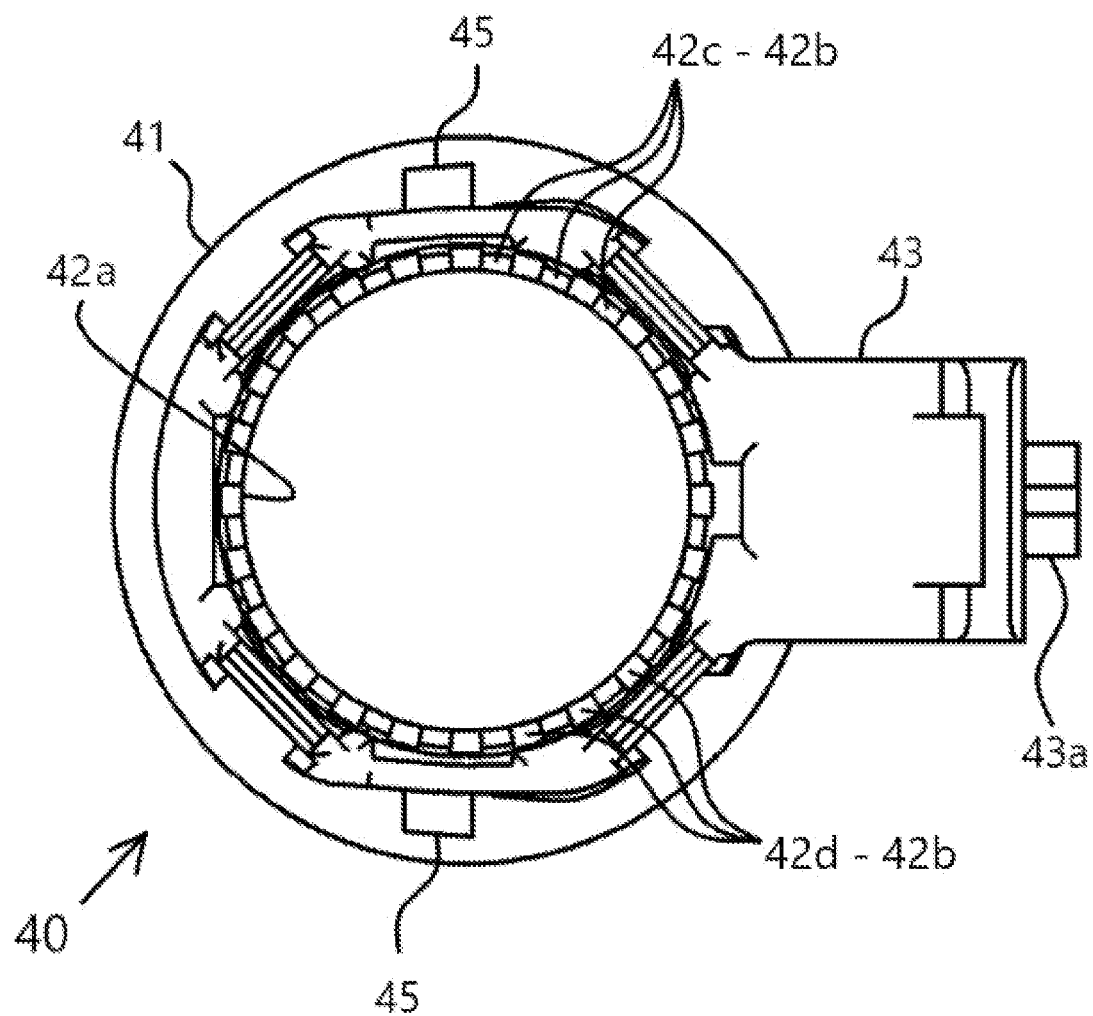
FIG. 11 is a back view of a bezel which illustrates concave portions and convex portions of a taper portion of an inner flange.

As shown in FIGS. 6 and 11, tapered portion 42b has concave portions 42c and convex portions 42d which are alternately formed in and on the inner periphery in the circumferential direction thereof, so that the tapered portion 42b has a rectangular wave-shaped inner peripheral surface. The diameter that is a distance between two of the convex portions 42d which face each other is identical with the outer diameter of the flange 21 of the elastic member 20. In other words, when the side wall 31 is inserted into the bezel 40, the convex portions 42d of the bezel 40 contact the flange 21 of the elastic member 20, and gaps 60 are formed between the outer surface portion 42a of the bezel 40 and the flange 21 of the elastic member 20 and between the concave portions 42c of the bezel 40 and the flange 21 of the elastic member 20.

The bezel 40 has the attachment portion 43 which is provided on the second end thereof opposed to the front end in the axial direction and protrudes from the cylindrical portion of the bezel 40. The attachment portion 43 has a snap-fit feature with the claw 43a on a front end thereof. The attachment portion 43 engages the receiving portion 39 of the body 30 when inserted into a hole of the receiving portion 39.

The bezel 40 has the attachment hole 44 formed in the upper surface thereof. When viewed from the front side of the bezel 40, the attachment hole 44 is a square shaped hole into which the claw 38b of the attachment portion 38 is inserted. When the claw 38b of the attachment portion 38 is inserted into the attachment hole 44, it engages the inner wall of the attachment hole 44.

The bezel 40 is equipped with the locking claws 45 disposed on right and left sides of the outer periphery thereof. The locking claws 45 are formed at locations in view of the thickness of the bumper 100, that is, arranged at an interval equivalent to or slightly more than the thickness of the bumper 100 away from the end surface of the outer flange 41. The locking claws 45 are used to prevent the bezel 40 from being accidentally dislodged from the bumper 100. When the side wall 31 of the body 30 is inserted into the bezel 40 after the bezel 40 is attached to the bumper 100, force will be exerted on the bezel 40 in a direction in which the bezel 40 is removed from the bumper 100. In order to avoid this problem, when the bezel 40 is inserted into the bumper 100, the locking claws 45 engage the end surface of the bumper 100 to hold the bezel 40 from being removed from the bumper 100.

The bezel 40 has a plurality of, for example, four metallic springs 50 arranged at even intervals away from each other. The metallic springs 50 are formed in the shape of a convex bulging outwardly in the radial direction of the bezel 40, Therefore, when stress acts on the metallic springs 50 in the radial direction from outside the bezel 40, will cause the metallic springs 50 to be elastically deformed to exert stress on the inner surface of the bezel 40.

Figure 7:
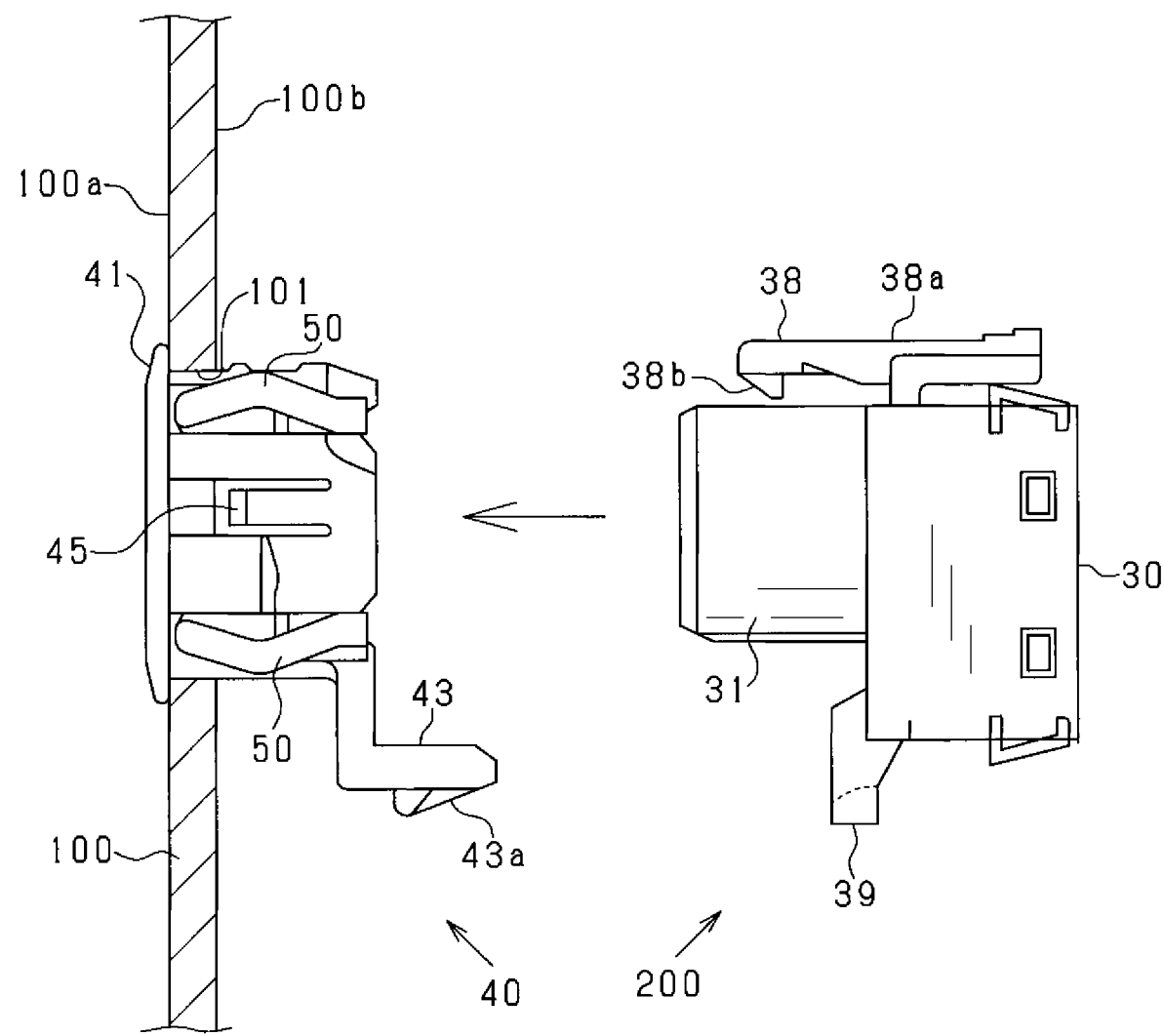
FIG. 7 is a view which illustrates how to attach an ultrasonic sensor to a bumper.

Next, how to attach the ultrasonic sensor to the bumper 100 will be described below. First, the bezel 40 is, as illustrated in FIG. 7, inserted into the hole 101 of the bumper 100 at one of opposed surfaces, that is, the front 100a of the bumper 100 until the locking claws 45 are located inside the back 100b of the bumper 100. This causes the open end of the hole 101 of the bumper 100 to contact the metallic springs 50. The insertion of the bezel 40 into the hole 101 of the bumper 100 causes the metallic springs 50 to be elastically deformed by the open end of the hole 101 of the bumper 100, thereby exerting stress on the inner surface of the bezel 40.

Afterwards, the side wall 31 of the body 30 is inserted into the inner space of the bezel 40 at the other side of the bumper 100, that is, the back 100b of the bumper 100. This causes the top of the attachment portion 43 to be inserted into the hole of the receiving portion 39, so that the claw 43a contacts the inner wall of the receiving portion 39 and then is elastically deformed. When the top of the attachment portion 43 is fully inserted into the receiving portion 39, the elastic deformation of the claw 43a is released, so that the claw 43a firmly engages the receiving portion 39 to complete the attachment of the ultrasonic sensor to the bumper 100. Simultaneously, the claw 38b of the attachment portion 38 contacts the outer wall of the bezel 40, so that the bar 38a is elastically deformed. When the claw 38b fully enters the attachment hole 44, the elastic deformation of the bar 38a is released, so that the attachment portion 38 firmly engages the attachment hole 44.

Figure 8:
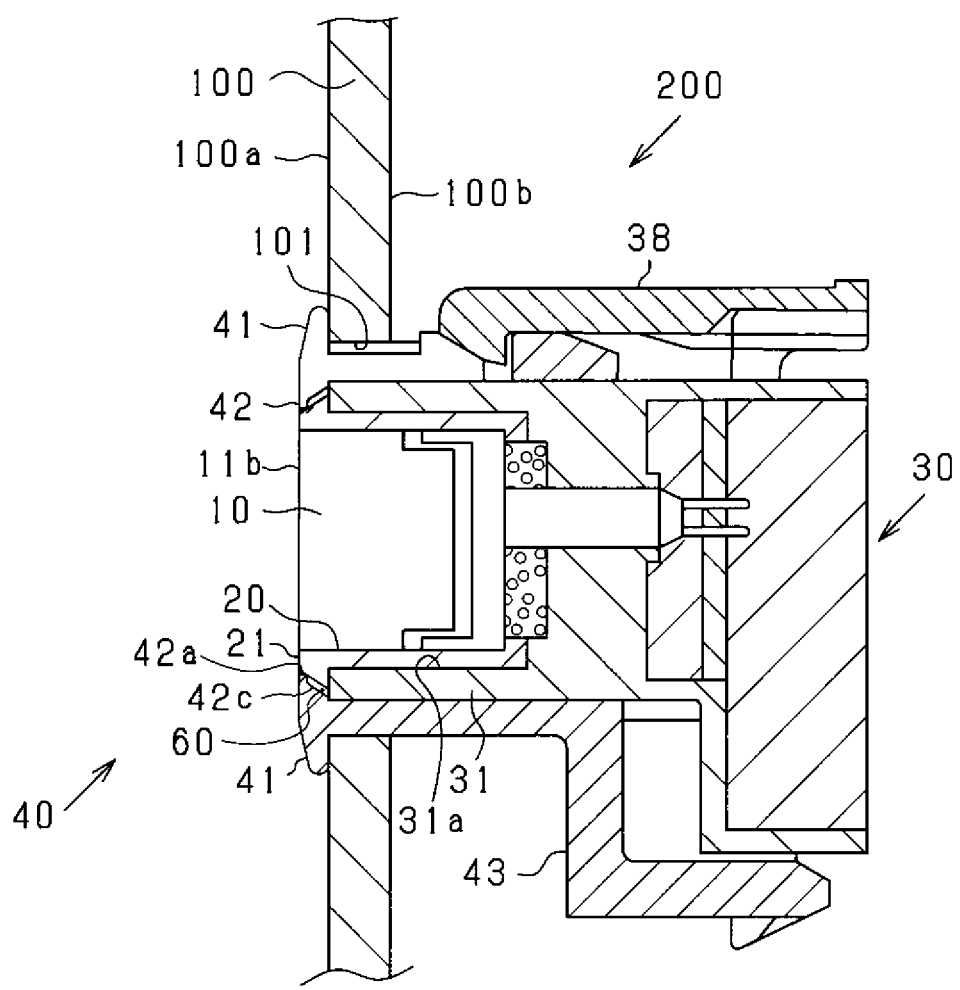
FIG. 8 is a sectional view of an ultrasonic sensor secured to a bumper.
Figure 9:
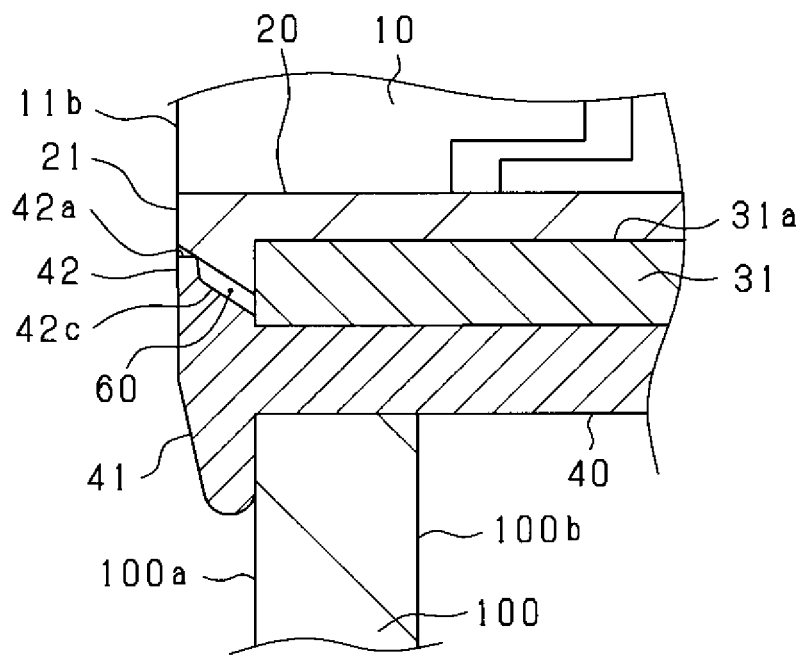
FIG. 9 is an enlarged sectional view of an ultrasonic sensor mounted on a bumper.

FIG. 8 illustrates a section of the ultrasonic sensor installed in the bumper 100 in the above way. FIG. 9 illustrates an enlarged section of the top portion of the ultrasonic sensor. The outer flange 41 of the bezel 40 is placed in contact with the bumper 100. The inner flange 42 of the bezel 40 is placed in contact with the upper end of the side wall 31 of the body 30.

The outer surface portion 42a of the inner flange 42 of the bezel 40 has a constant inner diameter, while the concave portions 42c of the inner flange 42 of the bezel 40 have an inner diameter greater than the outer diameter of the flange 21 of the elastic member 20, so that the gaps 60 are produced between the inner flange 42 of the bezel 40 and the flange 21 of the elastic member 20. The angle which the tapered portion 42b of the inner flange 42 of the bezel 40 makes with the center axis is, as described above, set equal to the angle which the flange 21 of the elastic member 20 makes with the center axis, so that the gaps 60 between the tapered portion 42b of the bezel 40 and the flange 21 of the elastic member 20 have a dimension kept constant in the direction of the center axis. Additionally, the inner diameter of the convex portions 42d of the inner flange 42 of the bezel 40 is selected to be equal to the outer diameter of the flange 21 of the elastic member 20, so that the convex portions 42d are placed in contact with the flange 21 of the elastic member 20.

Figure 10:
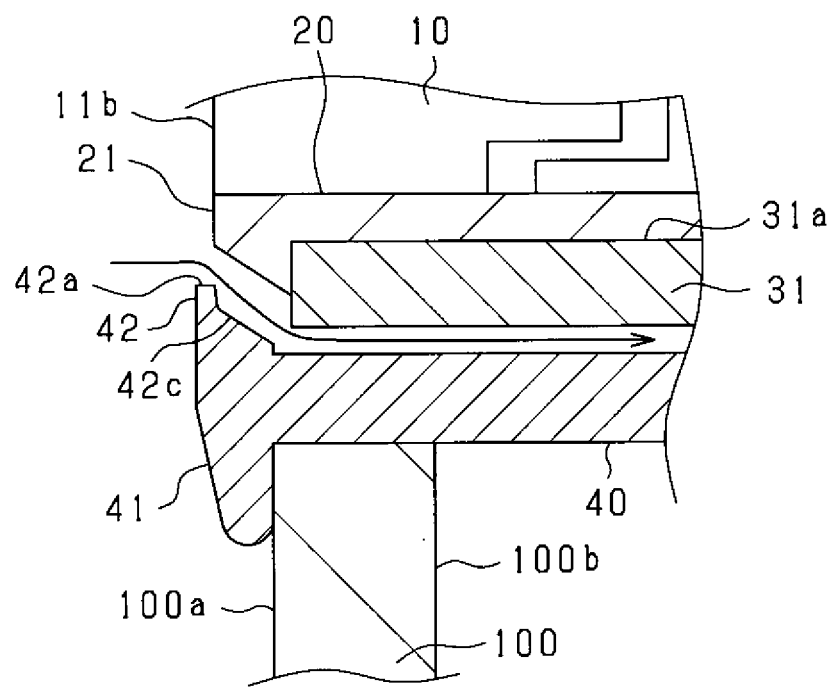
FIG. 10 is a view which illustrates a flow path of water when a front of a bumper is splashed with water.

FIG. 10 demonstrates a flow path of water in the ultrasonic sensor attached to the bumper 100 in the above way when the ultrasonic sensor is splashed with water at the front 100a of the bumper 100. The flow path is indicated by an arrow in FIG. 10. The water enters the gaps 60 between the outer surface portion 42a and the flange 21, so that the pressure of the water results in at least either of deformation of the flange 21 or misalignment of the sensor body 200. This causes the water to enter more deeply in the gaps 60. The pressure of the water then pushes the side wall 31 of the body 30 inwardly in the bumper 100, so that the inner flange 42 of the bezel 40 and the upper end of the side wall 31 of the body 30 are moved away from each other. This causes the water to pass through the gaps 60, flow between the inner flange 42 of the bezel 40 and the side wall 31 of the body 30, and then be discharged outside the body 30.

The pressure of water also acts not only on the side wall 31, but also on the elastic member 20. This results in an increase in pressure by which the elastic member 20 and the oscillator 10 contact with each other, thereby avoiding the entrance of water into the oscillator 10 and the elastic member 20. The pressure by which the flange 21 of the elastic member 20 and the upper end of the side wall 31 contact with each other is also increased to avoid the entrance of water into the elastic member 20 and the body 30.

In general, a joint of the end of the bottom 11a and the cylinder 11c of the housing 11 of the oscillator 10 is chamfered in an arc shape. This results in formation of a gap between the oscillator 10 and the elastic member 20 when the oscillator 10 is disposed inside the elastic member 20, thereby leading to a risk that water enters the body 30 at the gap. In order to avoid this drawback, the gaps 60 between the inner flange 42 of the bezel 40 and the flange 21 of the elastic member 20 are designed to have a size greater than that of a clearance between the oscillator 10 and the elastic member 20 in the radial direction of the oscillator 10, the elastic member 20, and the bezel 40, that is, a direction in which the oscillator 10, the elastic member 20, and the bezel 40 contact each other. This causes water with which the ultrasonic sensor is splashed to enter the gaps 60 between the elastic member 20 and the bezel 40 more than the clearance between the oscillator 10 and the elastic member 20. This results in an increase in pressure by which the elastic member 20 is urged to make a contact with the oscillator 10, thereby minimizing the amount of water entering the clearance between the elastic member 20 and the oscillator 10.

With the above arrangements, the ultrasonic sensor of this embodiment offers the following beneficial advantages.

When the transceiving surface 11b is splashed with water at the front 100a of the bumper 100 that is an attachment object, the water enters the gaps 60 between the elastic member 20 and the bezel 40 and then moves to the back 100b of the bumper 100. The pressure of the water is exerted on the elastic member 20 to deform the elastic member 20, thereby increasing the pressure to urge the elastic member 20 into contact with the oscillator 10. This minimizes the entrance of water into between the elastic member 20 and the oscillator 10, thereby preventing water form entering the body 30 when the transceiving surface 11b is splashed with water at the front 100a of the bumper 100.

The flange 21 of the elastic member 20 is formed in a tapered shape, thereby causing the pressure applied to the gaps 60 to urge the elastic member 20 against the oscillator 10, which minimizes the entrance of water into the clearance between the oscillator 10 and the elastic member 20.

The convex portions 42d of the outer flange 41 of the bezel 40 are arranged in contact with the flange 21 of the elastic member 20, thereby minimizing deformation of the body 30 when installed in the bezel 40 and creating the gap 60 in each of the concave portions 42c between the respective adjacent convex portions 42d.

The flange 21 of the elastic member 20 is formed in a tapered shape to have an inner dimension increasing away from the transceiving surface 11b, while the inner flange 42 of the bezel 40 is formed in a tapered shape to have an outer dimension increasing away from the transceiving surface 11b. The gaps 60 serving as flow paths of water, therefore, work as paths through which the water is guided outside the body 30, thereby minimizing the ingress of water into the body 30.

The bezel 40 is attached to the bumper 100 from outside the front 100a, while the body 30 is secured to the bumper 100 from outside the back 100b. When a foreign object enters the gaps 60, it may be taken away easily by removing the body 30 to expose the inside of the bezel 40.

The bezel 40 is combined with the body 30 by attaching the cylindrical portion 40a to the side wall 31 of the body 30, thereby eliminating any play of the bezel 40 relative to the body 30 in the radial direction thereof. The interval between the top end of the elastic member 20 and a facing portion of the bezel 40 is small in the thickness-wise direction of the ultrasonic sensor, but however, the joining of the cylindrical portion 40a and the side wall 31 creates the gaps 60 whose sizes are equal to each other in the circumferential direction thereof.

When the ultrasonic sensor is splashed with water, the pressure of the water will result in misalignment between the body 30 and the bezel 40 to create, as described above, the flow paths of the water. The ingress of grit or dust into the flow paths is, therefore, minimized when the pressure of the water is not being exerted on the bezel 40 and the body 30.

Modifications

The inner flange 42 of the bezel 40 in this embodiment has the concave portions 42c and the convex portions 42d arranged alternately. The convex portions 42d are placed in contact with the flange 21 of the elastic member 20. The inner flange 42 of the bezel 40 may alternatively be designed not to have the concave portions 42c and the convex portions 42d. In this case, the inner flange 42 of the bezel 40 is designed to have an inner diameter greater than the outer diameter of the flange 21 of the elastic member 20 to create the gaps 60 between the bezel 40 and the elastic member 20 when the body 30 is installed in the bezel 40.

The bezel 40 in this embodiment has the concave portions 42c and the convex portions 42d which are of a rectangular shape and arranged in the form of a wave in the circumferential direction of the front end portion thereof to create the gaps 60 between the bezel 40 and the elastic member 20, but instead, the bezel 40 and the elastic member 20 may alternatively be shaped to create the gaps 60 therebetween without use of the concave portions 42c and the convex portions 42d when the body 30 is installed in the bezel 40. For instance, the bezel 40 may have formed thereon triangular protrusions arranged in the circumferential direction thereof.

In the embodiment, the flange 21 of the elastic member 20 and the inner flange 42 of the bezel 40 are tapered, but however, only one or neither of them may be formed in the tapered shape.

In the embodiment, the inner flange 42 of the bezel 40 has the concave portions 42c and the convex portions 42d arranged alternately, but however, the flange 21 of the elastic member 20 may alternatively be shaped to have concave and convex portions formed alternately. Both the inner flange 42 of the bezel 40 and the flange 21 of the elastic member 20 may be designed to have concave and convex portions formed alternately.

The embodiment has referred to the ultrasonic sensor as being attached to the bumper 100 of a vehicle, but an attachment object on which the ultrasonic sensor is mounted is not limited to the bumper 100, but may be secured to another part of the vehicle. The attachment object may be selected to be an object other than a vehicle.

What is claimed is:

1. An ultrasonic sensor which is attached to an attachment object and passes through the attachment object, comprising:
   an oscillator which has a transceiving surface which transmits or receives an ultrasonic wave;
   a cylindrical elastic member which surrounds an outer surface of the oscillator which extends from the transceiving surface in a thickness-wise direction of the transceiving surface, the elastic member having an inner surface contacting the outer surface of the oscillator;
   a body which has a housing with a bottom and in which the oscillator and the elastic member are disposed except a protruding portion on a side of the transceiving surface; and
   an annular body which surrounds the protruding portion of the elastic member and is disposed in the body in contact with a front of the attachment object,
   wherein a gap is provided between an outer surface of the protruding portion of the elastic member and an inner surface of the annular body which faces the outer surface of the protruding portion, and
   wherein one of the outer surface of the protruding portion of the elastic member and the inner surface of the annular body has a plurality of concave portions and a plurality of convex portions formed in a circumferential direction thereof which create the gap.

2. The ultrasonic sensor according to claim 1, wherein the gap is formed to have a size greater than that of a clearance between an inner surface of the protruding portion of the elastic member and an outer surface of the oscillator facing the inner surface of the protruding portion in a direction in which the oscillator, the elastic member, and the annular body contact each other.

3. The ultrasonic sensor according to claim 1, wherein the front of the attachment object and a back of the attachment object communicate with each other through the gap.

4. The ultrasonic sensor according to claim 1, wherein the protruding portion of the elastic member has an outer surface which is tapered and has an outer dimension increasing away from the transceiving surface.

5. The ultrasonic sensor according to claim 4, wherein the annular body has an inner surface which is tapered to have an inner dimension increasing away from the transceiving surface.

6. The ultrasonic sensor according to claim 1, wherein the annular body is attached to the attachment object from outside the front of the attachment object, while the body is attached to the attachment object from behind a back of the attachment object.

7. The ultrasonic sensor according to claim 1, wherein the body has a side wall which defines the housing, and wherein the annular body has a cylindrical portion arranged outside the side wall.

8. An ultrasonic sensor that is attached to an attachment object and passes through the attachment object, comprising:
   an oscillator comprising a transceiving surface which transmits or receives an ultrasonic wave;
   an elastic member comprising a cylindrical shape and configured to surround an outer surface of the oscillator which extends from the transceiving surface in a thickness-wise direction of the transceiving surface, the elastic member comprising an inner surface contacting the outer surface of the oscillator;

a body comprising a housing with a bottom and in which the oscillator and the elastic member are disposed except a protruding portion on a side of the transceiving surface; and an annular body configured to surround the protruding portion of the elastic member and is disposed in the body in contact with a front of the attachment object, wherein a gap is provided between an outer surface of the protruding portion of the elastic member and an inner surface of the annular body which faces the outer surface of the protruding portion, and wherein the elastic member is configured to deform under pressure of water exerted on the elastic member, thereby increasing pressure to urge the elastic member into contact with the oscillator.

* * * * *